United States Patent Office 3,700,658
Patented Oct. 24, 1972

---

3,700,658
N-ALKYL-N-ARYLCARBAMOYL LACTAMS
Adolf Steinhofer, 11 Wolframstrasse; Helmut Doerfel, 7 Edenkobener Strasse; and Georg Falkenstein, 6 Hafenstrasse, all of 6700 Ludwigshafen, Germany; and Wolfgang-Dieter Jeserich, 25 Eulenweg, 6715 Lambscheim, Germany
No Drawing. Original application July 3, 1968, Ser. No. 742,142. Divided and this application Sept. 25, 1970, Ser. No. 75,721
Claims priority, application Germany, July 5, 1967, P 17 20 280.1
Int. Cl. C07d 41/06
U.S. Cl. 260—239.3 R                4 Claims

ABSTRACT OF THE DISCLOSURE

New N-alkyl-N-arylcarbamoyl lactams which are suitable as activators for the anionic polymerization of lactams.

---

This application is a division of application Ser. No. 742,142, filed July 3, 1968, now abandoned.

This invention relates to N-alkyl-N-arylcarbamoyl lactams having the formula

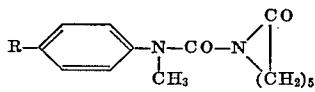

which may be used as activators for the anionic polymerization of lactams. Those compounds having the said formula are suitable in which R is hydrogen, methyl, methoxy, dimethylamino, carboxymethyl, acetyl, fluorine, chlorine or nitro; of these, hydrogen, methyl, methoxy, fluorine, chlorine and nitro are of particular interest. Preferred compounds are N-methyl-N-phenylcarbamoyl caprolactam, N-methyl - N - (p-methoxyphenyl)-carbamoyl caprolactam and N-methyl-N-(p-chlorophenyl)-carbamoyl caprolactam.

The N-methyl-N-arylcarbamoyl lactams according to the present invention may be prepared by the following procedure which is illustrated by the following equation

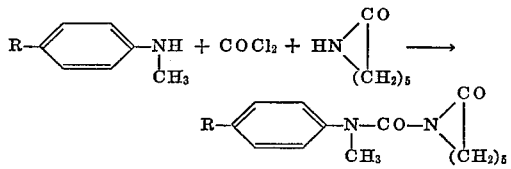

Half of the equivalent amount of phosgene is fed at a temperature of from −5° to +40° C. advantageously from 0° to 20° C. into a solution of 1 mole of a p-substituted N-methyl aniline compound in an organic solvent. Suitable solvents are inert hydrocarbons and chlorinated hydrocarbons such as benzene, xylene, cumene and chloroform, preferably toluene. Then the remainder of the phosgene is passed at slightly elevated temperature (50°–80° C.) into the now pasty mixture in such a manner that phosgene cannot be detected in the hydrogen chloride gas which escapes.

After about three hours the evolution of gas ceases. The clear, slightly colored solution contains the carbamyl chloride in practically quantitative amounts.

Thereupon 1 mole of ε-caprolactam and 1 mole of a tertiary amine, e.g. triethylamine, are added to the solution which has been filtered hot and the mixture obtained is heated for five to seven, preferably for about six hours under reflux.

The hydrochloride of the tertiary base is filtered off, washed well with the solvent, and the filtrate is subsequently neutralized with aqueous bicarbonate and then washed again with distilled water.

The organic phase is separated off, carefully dried, preferably over $Na_2SO_4$ and finally subjected to fractional distillation. The resulting N-methyl-N-aryl-carbamoyl caprolactam is obtained as a colorless oil which can be crystallized out.

The compounds thus obtained have the advantage over known activators used in the anionic polymerization of lactams that the customary additives normally used to regulate the chain length are unnecessary. Furthermore, the pot life of the reaction mixture and the K-value of the resulting polylactams may be varied considerably. A further advantage of the activator compounds according to the invention is that they yield polyamide which have particularly stable end groups. Furthermore, these activators involve no health hazards and can therefore be used without special precautions in the anionic polymerization of lactams.

The polymerization can be effected in known manner. The individual components of the polymerization mixture can be admixed with one another in any sequence.

The activators to be used can be employed in amounts of 0.01 to 15% by weight, preferably 0.5 to 5% by weight, based on the weight of the lactam to be polymerized. For special purposes, amounts which differ from the above can also be employed. Mixtures of these new activators in any proportions can also be utilized.

The polymerization is carried out in known manner, suitably at temperatures between 80 and 200° C. For special purposes higher or lower temperatures may be chosen. At the beginning of the polymerization the temperatures of the reaction mixture is advantageously from 100° to 160° C.

Conventional polymerization catalysts may be used, such as alkali metals or alkaline earth metals, e.g. sodium, potassium or calcium, or basic compound thereof, such as amides or hydrides, alkali lactam compounds or organometallic compounds of metals belonging to Groups 1a, 2a and 3a of the Periodic System (Handbook of Chemistry and Physics, 46th ed. 1965–1966, p. B–3).

Lactams which may be polymerized according to the new process are lactams having from 5 to 13 ring members, in particular pyrrolidone, piperidone, caprolactam, caprylolactam, enantholactam, capric lactam, laurilactam and substituted lactams such as ε-ethyl-ε-caprolactam or φ-ethyl-φ-enantholactam, or mixtures of the compounds mentioned above. Lactams having from 7 to 9 ring members are preferred.

The polymerization can also be carried out in the presence of inert solvents, such as aliphatic and aromatic hydrocarbons or ethers. In this case polyamide powders are obtained which are suitable for example for the preparation of coatings by the fluidized bed process, as agents for clarifying beverages, or as binding agents for non-woven fabrics.

Soluble or insoluble dyes and fillers of all types may be added as long as these do not interfere with the action of the activator-catalyst system. These include the resins customarily used of, amongst others, inorganic materials, such as glass fibers, asbestos, other ceramic materials, graphite, gypsum chalk, molybdenum disulfide and natural materials such as pre-treated sawdust, natural and synthetic fibers, rayon, etc.

EXAMPLE 1

Preparation of N-methyl-N-(p-fluorophenyl)-carbamoyl caprolactam.

Half of the equivalent amount of phosgene is fed at 0°–20° C. into a solution of 125 g. (1 mole) of N- methyl-p-fluoroaniline B.P. 46°–49° C. (0.25 mm.) in 300 ml. of toluene. Then the remainder of the phosgene is passed at slightly elevated temperature (50°–80° C.) into the now pasty mixture in such a manner that phosgene cannot be detected in the hydrogen chloride gas which escapes.

After about three hours the evolution of gas ceases. The clear, slightly colored solution contains the carbamyl chloride with a melting point of 50° C. in practically quantitative amounts.

Thereupon 113 g. (1 mole) of ε-caprolactam and 101 g. (1 mole) of triethylamine are added to the solution which has been filtered hot and the mixture obtained is heated for six hours under reflux.

The hydrochloride of the tertiary base is filtered off, washed well with toluene, and the filtrate is subsequently shaken with 10% NaHCO₃ solution and then again washed with distilled water.

The organic phase is separated off, dried over $Na_2SO_4$ and finally subjected to fractional distillation. N-methyl-N-(p-fluorophenyl)-carmamoyl caprolatam, B.P. 156°–158° C. (0.3 mm.) is obtained as a colorless oil which is slow to crystallize out. The yield is 76% of the theory.

EXAMPLE 2

The preparation of N-methyl-N-phenylcarbamoyl caprolactam is carried out in the same manner as described in Example 1, but 1 mole of N-methylaniline is used instead of 1 mole of N-methyl-p-fluoroaniline. The substance has a boiling point of 166° C. (0.4 mm.) and is obtained in a yield of 88%.

EXAMPLE 3

N-methyl-p-methylaniline is reacted with phosgene, ε-caprolactam and triethylamine in molar amounts according to Example 1. N-methyl-N-(p-tolyl)-carbamoyl caprolactam with a boiling point of 163° C. (0.2 mm.) is obtained in a yield of 80%.

EXAMPLE 4

N-methyl-N-(p-methoxyphenyl)-carbamoyl caprolactam is obtained from N-methyl-p-methoxyaniline proceeding according to Example 1 in a yield of 52%. Its boiling point is 169° C. (0.1 mm..).

EXAMPLE 5

N-methyl-N-(p-chlorophenyl)-carbamoyl caprolactam is obtained from N-methyl-p-chloraniline proceeding in the manner of Example 1. The yield is 82% and the boiling point 160° C. (0.01 mm.).

EXAMPLE 6

N-methyl-N-(p-nitrophenyl) - carbamoyl caprolactam is obtained from N-methyl-p-nitroaniline proceeding in the manner of Example 1. The yield is 7.4% and the boiling point 97° C.

EXAMPLE 7

43 parts of caprolactam and 7 parts of a 17% solution of sodium caprolactam in caprolactam are melted together and are intimately mixed at 150° C. with a solution of 2.4 parts of N-methyl-N-phenylcarbamoyl caprolactam in 48.1 parts of caprolactam. The mixture thereupon commences to polymerize. It becomes viscous after 2 minutes 30 seconds and solid after 4 minutes 36 seconds. The temperature of the mixture increases to 190° C. in 3 minutes. The polymer has an extractables content of 5%. The K value cannot be measured because the polymer is not completely soluble in 96% sulfuric acid.

EXAMPLE 8

43 parts of caprolactam and 7 parts of a 17% solution of sodium caprolactam in caprolactam are melted together and are intimately mixed at 150° C. with a solution of 2.7 parts of N-methyl-N-(p-methoxyphenyl) carbamoyl caprolactam in 48.1 parts of caprolactam. The mixture thereupon commences to polymerize. It becomes viscous in 4 minutes 12 seconds and solid after 6 minutes 36 seconds. The temperature of the mixture increases to 190° C. in 5 minutes 30 seconds. The polymer has an extractables concentration of 4.0%. The K value cannot be measured because the polymer is not completely soluble in 96% sulfuric acid.

EXAMPLE 9

43 parts of caprolactam and 7 parts of a 17% solution of sodium caprolactam in caprolactam are melted together and intimately mixed at 120° C. with a solution of 2.8 parts of N-methyl-N-(p-chlorophenyl)-carbamoyl caprolactam in 48.1 parts of caprolactam. The mixture thereupon commences to polymerize. It becomes viscous in 3 minutes 48 seconds and solid in 6 minutes. The temperature of the mixture increases to 170° C. in 5 minutes 30 seconds. The polymer has an extractables concentration of 3.3%. The K value cannot be measured because the polymer is not completely soluble in 96% sulfuric acid.

EXAMPLE 10

The starting materials used in Example 9 are intimately mixed at 150° C. The mixture thereupon commences to polymerize. It becomes viscous after 54 seconds and solid after 2 minutes. The temperature of the mixture increases to 200° C. in 2 minutes 18 seconds. The polymer has an extractables concentration of 5.3%. The K value cannot be measured because the polymer is not completely soluble in 96% sulfuric acid.

What we claim is:
1. An N-methyl-N-arylcarbamoyl lactam of the formula

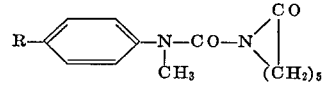

where R denotes hydrogen, fluorine, chlorine, methyl, methoxy, cyano, dimethylamino, nitro or carboxymethyl.
2. N-methyl-N-phenylcarbamoyl caprolactam.
3. N-methyl-N-(p-methoxyphenyl) - carbamoyl caprolactam.
4. N-methyl-N-(p-chlorophenyl) - carbamoyl caprolactam.

References Cited

UNITED STATES PATENTS 3,304,291  2/1967  Dachs et al. ____ 260—239.3 R

OTHER REFERENCES

Stehlicek et al.: "Coll. Czech. Chem. Commun.," vol. 32, pp. 370–381 (1967).

HENRY R. JILES, Primary Examiner

R. T. BOND, Assistant Examiner

U.S. Cl. X.R.

260—78 R